Aug. 19, 1969  A. STROBEL ETAL  3,461,827
AUTOMATIC BLIND STITCH SEWING MACHINE
Filed Sept. 2, 1966  8 Sheets-Sheet 1

INVENTORS
ALFONS STROBEL
LOTHAR SOMMERSCHUH
BY Paul M. Craig, Jr.
ATTORNEY

INVENTORS
ALFONS STROBEL
LOTHAR SOMMERSCHUH
BY Paul M. Craig, Jr.
ATTORNEY

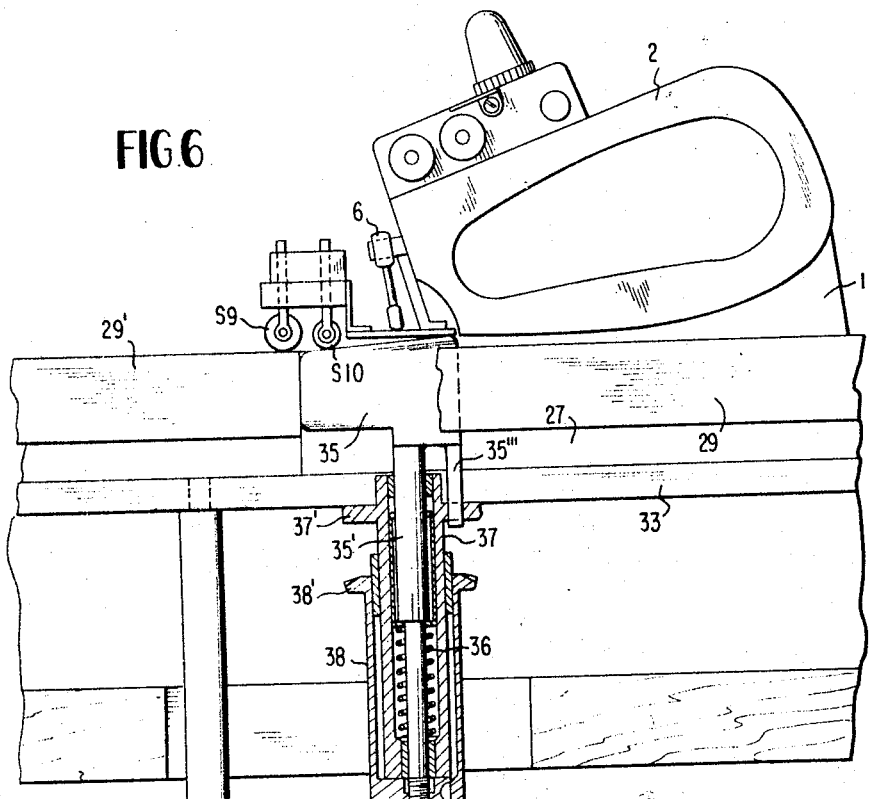

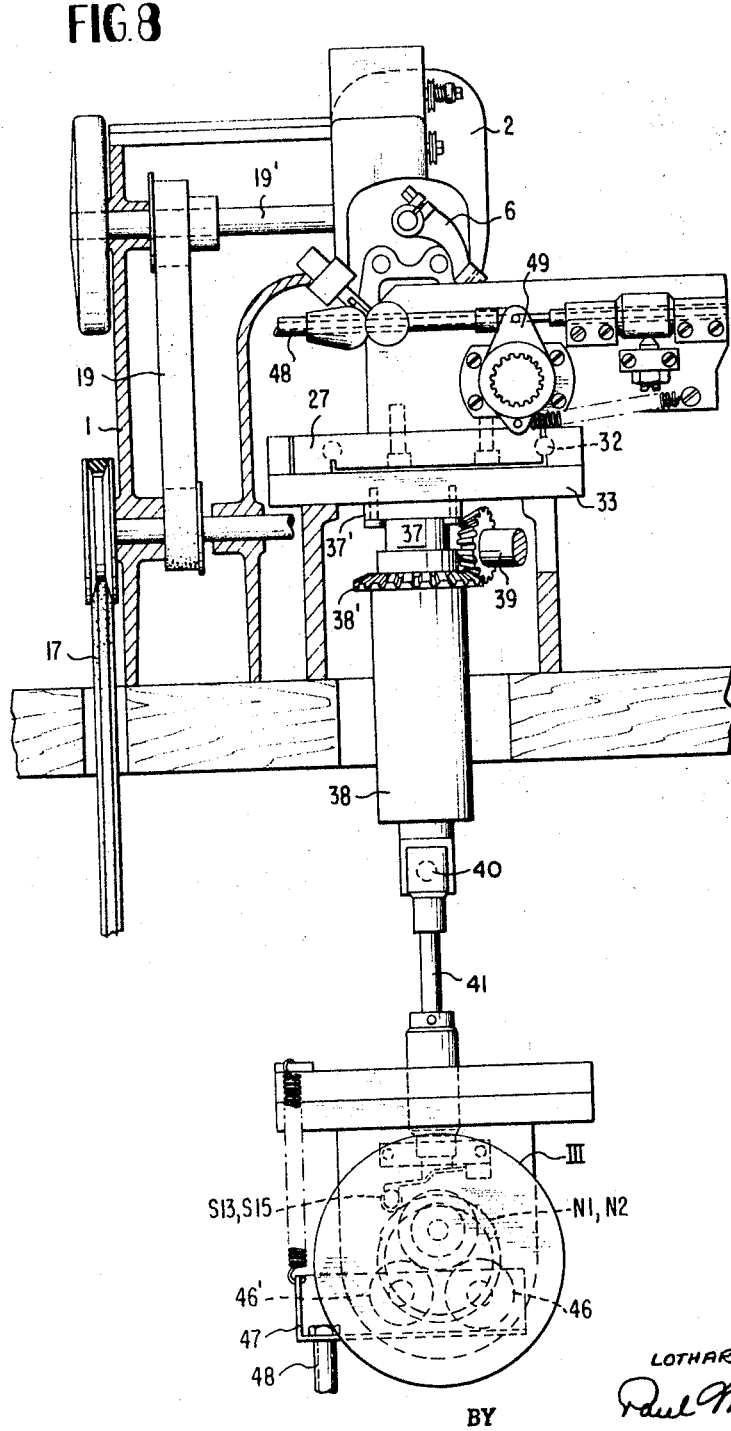

Aug. 19, 1969  A. STROBEL ETAL  3,461,827
AUTOMATIC BLIND STITCH SEWING MACHINE
Filed Sept. 2, 1966  8 Sheets-Sheet 5

INVENTOR
ALFONS STROBEL
LOTHAR SOMMERSCHUH

Paul M. Craig, Jr.
BY
ATTORNEY

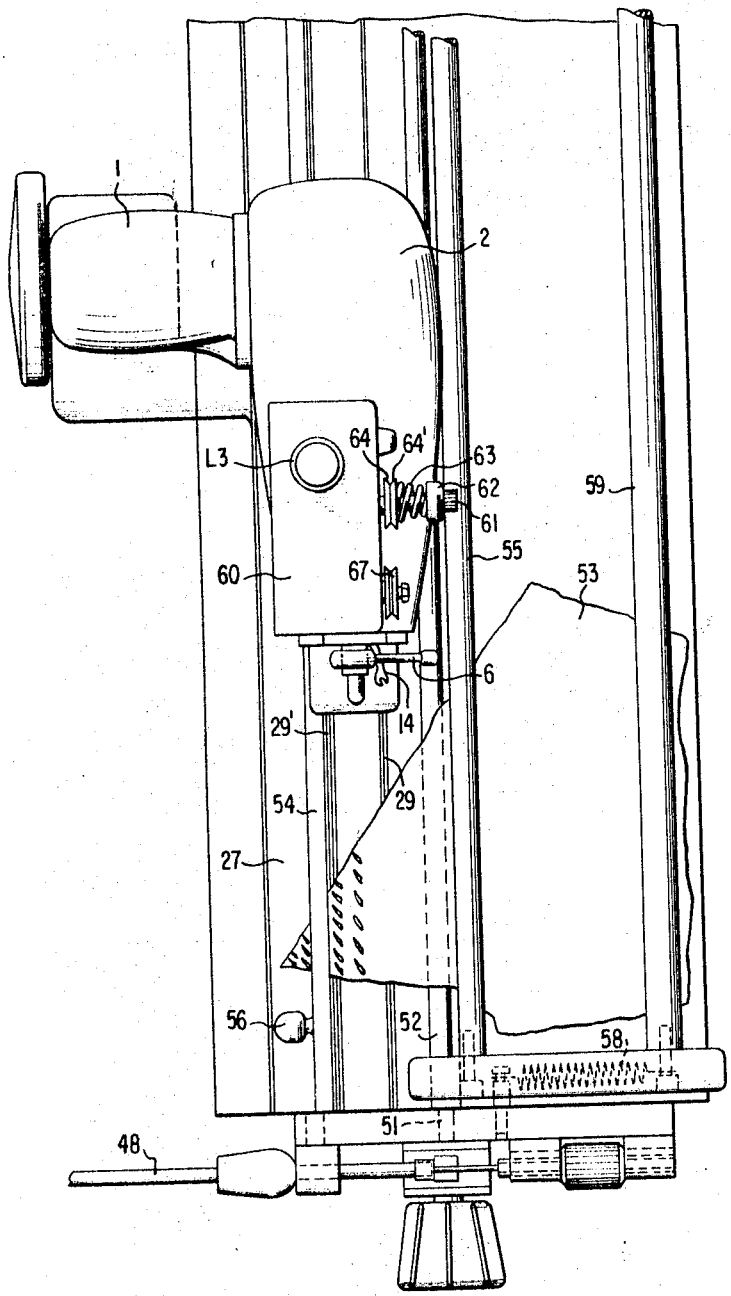

United States Patent Office 3,461,827
Patented Aug. 19, 1969

3,461,827
AUTOMATIC BLIND STITCH SEWING MACHINE
Alfons Strobel, Grunwald, near Munich, and Lothar Sommerschuh, Oberschleissheim, near Munich, Germany, assignors to J. Strobel & Soehne, Spezial-Naechmaschinen-Fabrik, Munich, Germany
Filed Sept. 2, 1966, Ser. No. 577,029
Claims priority, application Germany, Sept. 4, 1965, St 24,355
Int. Cl. D05b 1/24, 19/00, 11/00
U.S. Cl. 112—178     30 Claims

ABSTRACT OF THE DISCLOSURE

A blind stitch sewing machine, specifically a padding machine for the automatic padding of layers of material placed one above another, but more specifically for the automatic roll padding of lapels of coats, jackets, overcoats and similar pieces of garments, wherein material contact switches control the sequence of operations and a magnetic thread breakage detector is provided.

Background of the invention

In the prior art, there are blind stitch sewing machines for joining pieces of material placed one above another, which are provided with a movable carriage for longitudinal feed of the material and a step by step switch gear for the transverse feed of the layered material.

Summary of the invention

It is an object of the present invention to provide a blind stitch sewing machine to more economically and satisfactorily join layers of material together.

It is a further object of the present invention to provide an automatic blind stitch sewing machine to execute simultaneously and automatically roll padding of both lapels of coats, jackets, etc.

The blind stitch sewing machine of the present invention performs this automatic operation by employing automatic controls including a special electric switch gear unit for conducting lapel-roll padding work entirely automatically through seams independent from and parallel to each other, separate and of different predetermined desired length and distances.

Brief description of the drawing

Further objects, features and advantages of the present invention will appear from the following description of the accompanying drawing, in which:

FIGURE 6 is a side elevation view, partially in cross-section, showing the details of the ridge forming plunger drive;

FIGURE 7 is a partial cross-sectional view illustrating the free wheeling drive mechanism for the lateral step-by-step feed motion for the layers of material to be sewn;

FIGURE 8 is a front partial cross-sectional elevation view of the ridge forming plunger and adjacent elements;

FIGURE 12 is a top plan view of the blind stitching machine according to the present invention with a lapel held on it in position to be sewn.

Detailed description of the drawing

Figure 1:
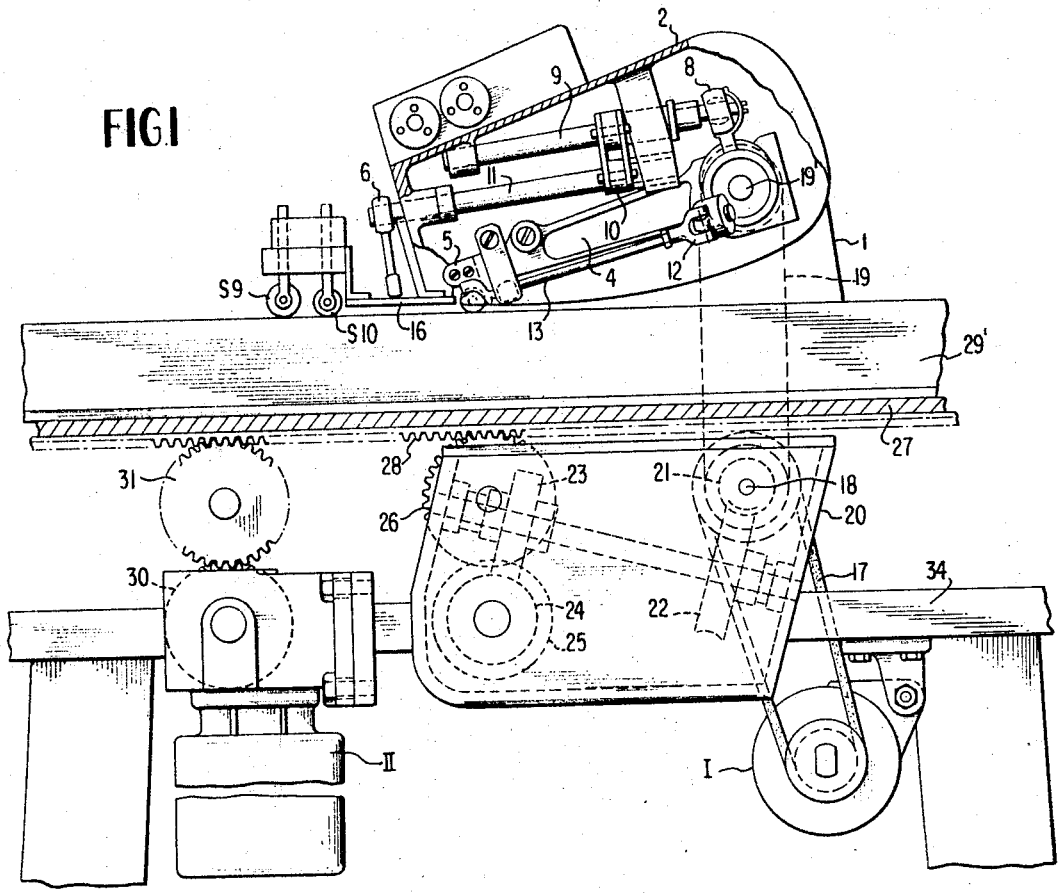
FIGURE 1 is a side elevation view of the automatic lapel-roll padding sewing machine of the present invention, with portions broken away and in section.
Figure 2:
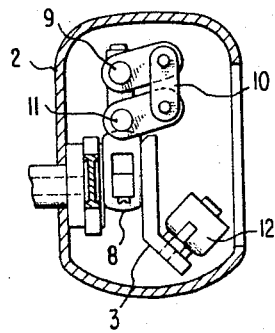
FIGURE 2 is a cross-sectional view through the head of the roll padding machine according to FIGURE 1.
Figure 3:
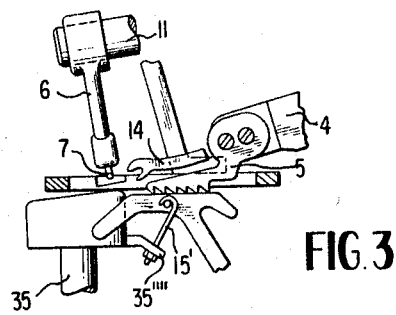
FIGURE 3 is a partial view illustrating the upper feed mechanism of the sewing machine.
Figure 5:
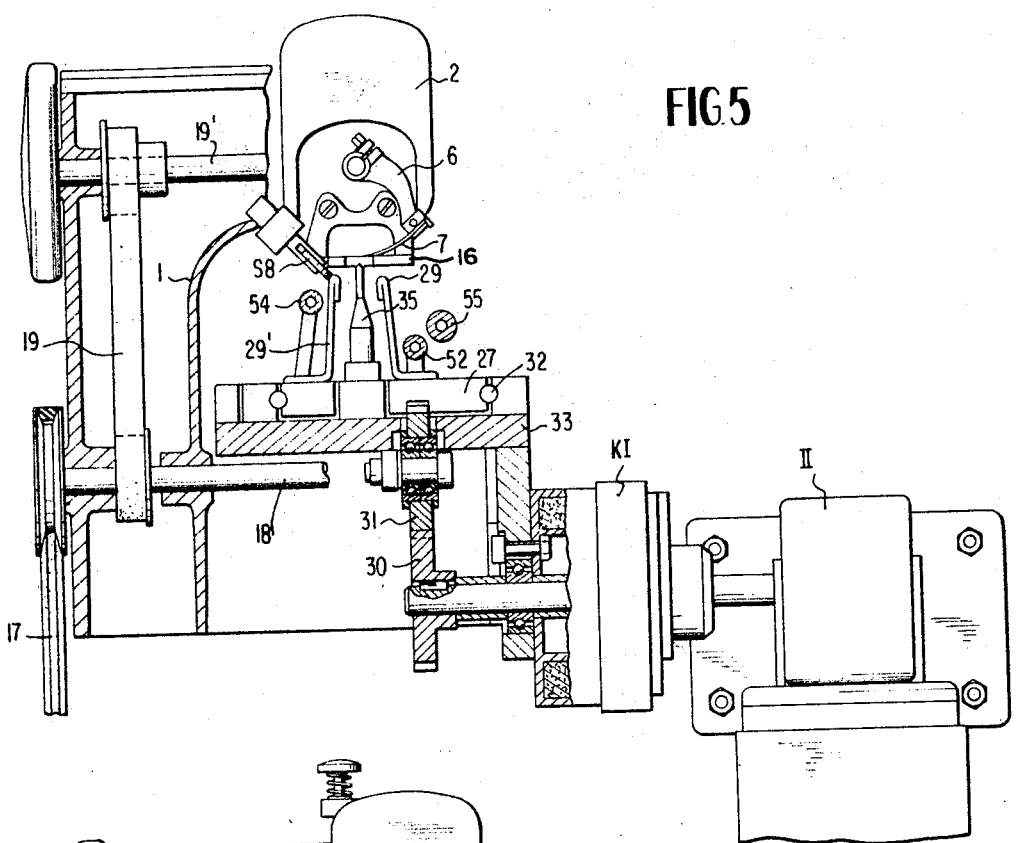
FIGURE 5 is a partial cross-sectional front view of the sewing machine, similar to FIGURE 4.
Figure 4:
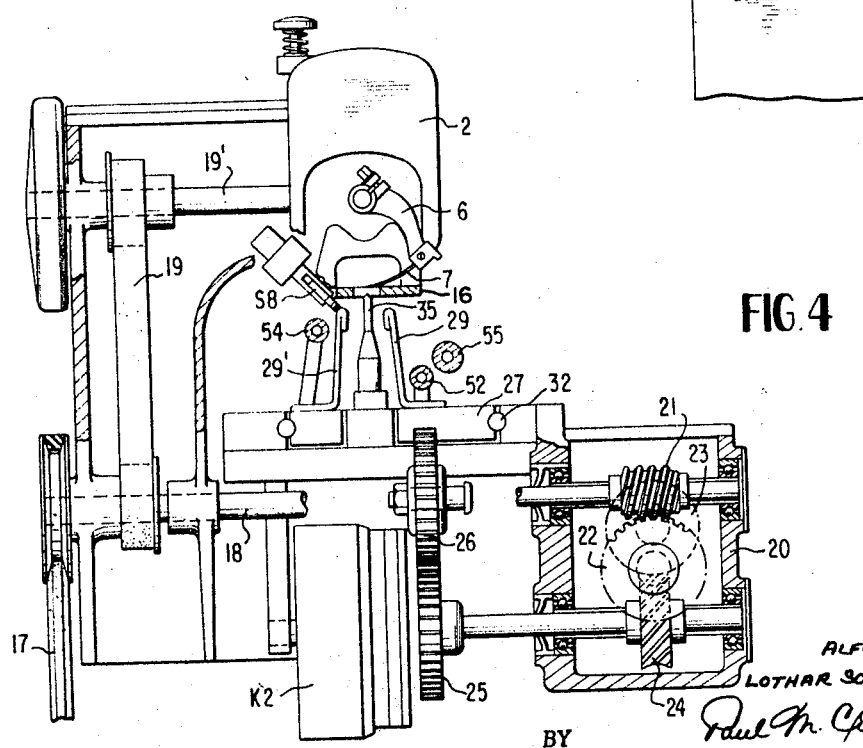
FIGURE 4 is a partial cross-sectional front view of the sewing machine.

The automatically lapel roll padding machine of the present invention has an arm 1 rigidly mounted on a support and extending upwardly and horizontally at a right angle over the work table for rigidly carrying the sewing machine head 2, which carries most of the important actuating mechanisms. Within the head 2, a crank eccentric 3 actuates a material carrier lever 4 for producing the back and forth motion for material carrier or top feed dog 5 (FIGURES 1–3). The conventional curved needle 6 is carried by needle lever 7. The needle lever 7 is oscillated by connecting rod 8 that moves an upper needle shaft 9. The upper needle shaft 9 is operatively connected with the lower needle shaft 11 for joint oscillation by means of horizontally extending substantially parallel lugs (FIGURE 2) that are rigidly attached to each of the shafts 9, and 11, and pivotally attached to each other by means of the connecting lever 10. A cross joint 12 moves a looper rod 13, which drives the looper according to conventional blind stitch operation. All of the above structure has not been described in detail, because it is conventional and operates according to the well known blind stitch process. It is contemplated that other well known constructions may be used, for example, a threaded looper may be employed.

In FIGURE 3, the material presser or work clamp is shown in its operative position for resiliently pressing the material against the stitch plate or presser foot 16 or against the top feed dog 5, whenever the layers of material are to be fed.

In FIGURE 1, there is shown the conventional sewing machine motor I that is provided with a needle high positioning device and mounted in a conventional pivotal manner to produce a tension on the feed belt 17, which through suitable pulleys drives the lower shaft 18. The lower shaft 18 in turn drives the upper or main sewing machine shaft 19' by means of a conventional belt having teeth and corresponding gear type pulleys. The main shaft 19' drives the connecting rod 8 and the cross joint 12, which have been described previously, in a conventional manner. The lower shaft 18 is housed in a gear box 20 and drives a worm gear 21 that in turn drives a worm wheel 22 rigidly connected to a cross shaft. The cross shaft carries a screw type gear 23 for driving a corresponding screw type gear 24 mounted on a shaft extending at right angles to the cross shaft. The screw gear 24 drives the gear 25 through their common shaft. The gear 25 is mounted outside of the gear box 20 for driving, in series, the gear 26 and the rack gear 28 that is rigidly attached for reciprocation with the movable carriage 27. The movable carriage 27 rigidly carries two substantially parallel and horizontally extending material carrying rails 29 and 29', which guide and hold the layers of material during blind stitching, particularly when they are bent in the roll padding of a lapel. In addition, the movable carriage 27 may be driven by the brake motor II through gear pair 30, 31, which engage the rack 28. This drive is more clearly shown in FIGURE 5, where it is seen that the electromagnetic clutch $K_1$ is operatively interposed in the drive connection between the brake motor II and the gear 30. The carriage 27 is mounted on a plurality of balls 32 (FIGURES 4 and 5) that are in turn received in bearings formed in a stationary table 33, which is mounted on a suitable rigid stand 34 (FIGURE 1). The material carrying rail 29' is operatively associated with three spaced push button switches S8, S9 and S10, which press upon the material carrying rail for a reason to be described hereinafter (FIGURES 1, 4, 5 and 6).

In FIGURES 3, 4, 5, and 6, there is shown the reciprocating plunger or material ridge forming device 35 which may be of conventional construction. The plunger 35 reciprocates between the material carrying rails 29 and 29' to form the material ridge in the blind stitch operation. The plunger 35 is actuated by means of the brake motor III (FIGURES 6 and 8) in an electrically controlled manner. As shown specifically in FIGURE 6, the plunger 35 has a downwardly depending extension 35' that is resiliently pressed upward at all times by means of the coil spring 36 that is mounted within the shell 37. The shell 37 is rigidly attached to the lower portion of the table 33 by means of screws or the like extending through the flange 37'. The shell 37 is carried within an additional shell 38 that is provided with an upper flange 38' formed on its periphery with a bevel gear, and a lower end threading. A lower threaded extension 35'' of the plunger 35 is threadingly received within the threaded lower end of the shell 38. The bevel gear on the extension 38' may be rotated by a complementary engaging bevel gear 39 that may be operated from the outside by means of a manual turning handle (not shown) for adjusting the vertical position of the plunger 35 (FIG. 8). The plunger 35 is provided with an offset downwardly extending pin 35''' that is received within a correspondingly shaped hole in the flange 37' (FIGURE 6) to prevent the plunger 35 from rotating. The lower end of the plunger 35 is connected by means of a joint 40 with a rod 41 that has a lower crank eye 41'. The crank eye 41' receives a bolt 42 that is mounted on a crank disc 43, which in turn is attached by means of a bolt to the round shaped piece 44 that is rigidly attached to the shaft 45 of the brake motor II.

Figure 11:
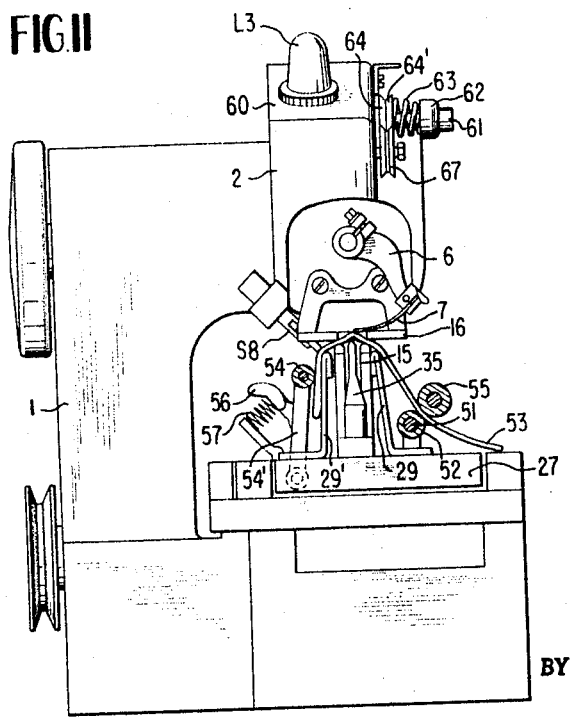
FIGURE 11 is a front elevation view illustrating the manner in which the material to be blind stitched is held by the blind stitching machine.

The crank eye 41' engages two rods 46 and 46' (FIGURES 6 and 8) that are mounted in an angle piece 47. The angle piece 47 is rotatably supported by a bearing 47' so that the angle piece 47 moves downwardly when the crank eye 41 is rotated 180° into its lower position, that is, when the brake motor III pulls the plunger 35 downwardly. When the angle piece 47 moves downwardly, a Bowden wire 48, that is, its shell, is lowered (FIGURE 8). When the Bowden wire shell 48 is lowered, it exerts a force on the lever 49 of a one way clutch mechanism 50 to engage the clutch and rotate the lever 49 with the shaft 51 that carries the feed roll 52 (FIGURES 11 and 12). This periodic rotation of the feed roll 52 is such that each rotation corresponds to the distance existing between two quilting seams. FIGURES 11 and 12 show how the lapel 53 is clamped between the two clamping cylinders 54, 55 and the feed roll 52. The cylinder 54 is pivotally mounted on an arm 54' that has a manual handle 56. The handle 56 is engaged by a spring 57 to move the cylinder 54 into its clamping position, and the handle 56 may be used to exert a pressure against the spring 57 to retract the cylinder 54 from its clamping position. Also, it is contemplated that a foot pedal may be used instead of the handle 56. The clamping cylinder 55 is resiliently moved into engagement with the feed roll 52 by means of a spring 58 (FIGURE 12). The handle 59 may be used to withdraw the clamping cylinder 55 from engagement with the feed roll 52 (FIGURE 12) a distance sufficient for the introduction or removal of the lapel 53 from that side of the machine.

Figure 9:
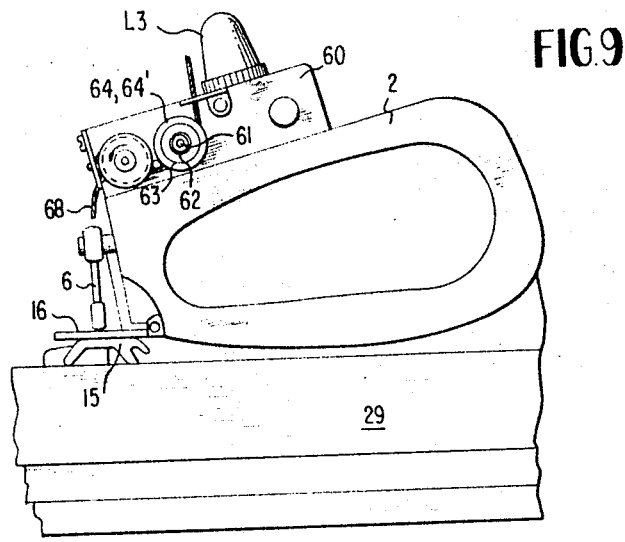
FIGURE 9 is a side elevation view of the specific thread-guard mechanism that is mounted on the head of the sewing machine according to the present invention.
Figure 10:
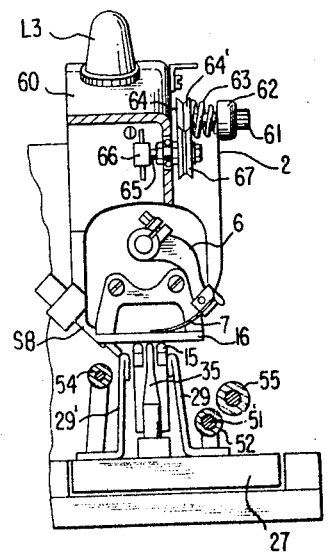
FIGURE 10 is a front elevation view, partially in section, of the thread-guard mechanism according to FIGURE 9.

FIGURES 9 and 10 show a special thread guard installation. The complete unit 60 is suitably mounted on the front end of the head 2. A standard thread tension screw 61 is used to adjust the thread tension nut 62 that in turn will change the tension of the spring 63 that is exerted upon the thread clamping disc 64, 64'. Within the unit 60, there is a shaft 65 carrying a permanent magnet 66 which drives the switch S6 (described in more detail with respect to FIGURE 13 hereinafter). After the thread has traveled through the thread tension device 61–64, it travels around the pulley 67 to rotate the shaft 65, which is rigidly attached to the pulley 67, and in turn rotates the magnet 66. In case of thread breakage, the red pilot light $L_3$ (FIGURES 9, 10, 11 and 13) will be operated as set forth in more detail below.

The automatic control unit that is the primary object of the present invention to control the function of the automaic roll padding machine will now be set forth below. A more detailed discussion will of necessity be made with regard to FIGURE 13.

The movable carriage 27 is mounted by means of the balls 32 at a convenient distance from the presser foot 16 and the needle 7.

Figure 13A:
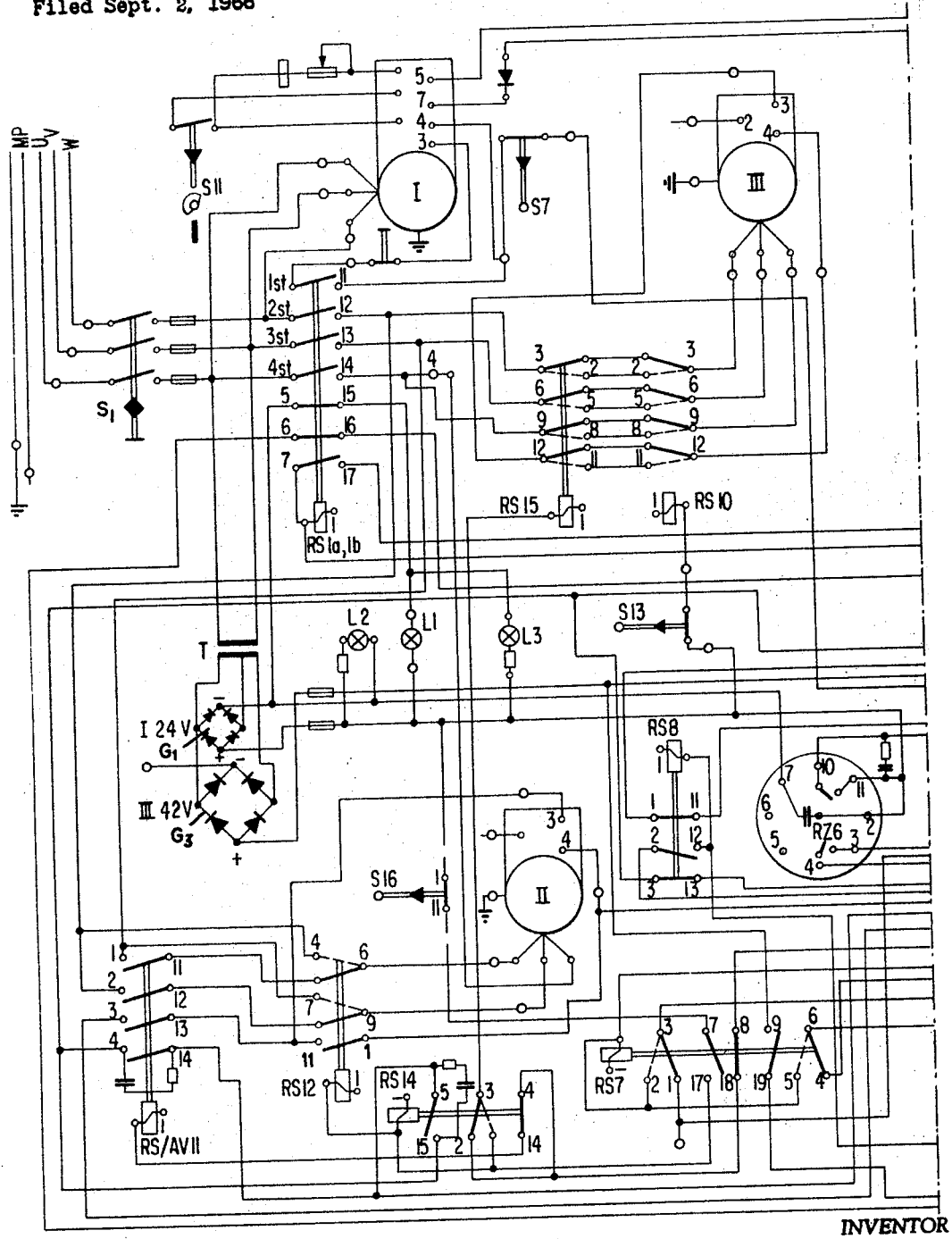
FIGURE 13 is an electrical diagram of the automatic controls employed with the roll padding machine of the present invention, and is divided into two parts, that is, 13a and 13b, for purposes of illustration on two sheets of the drawing.
Figure 13B:
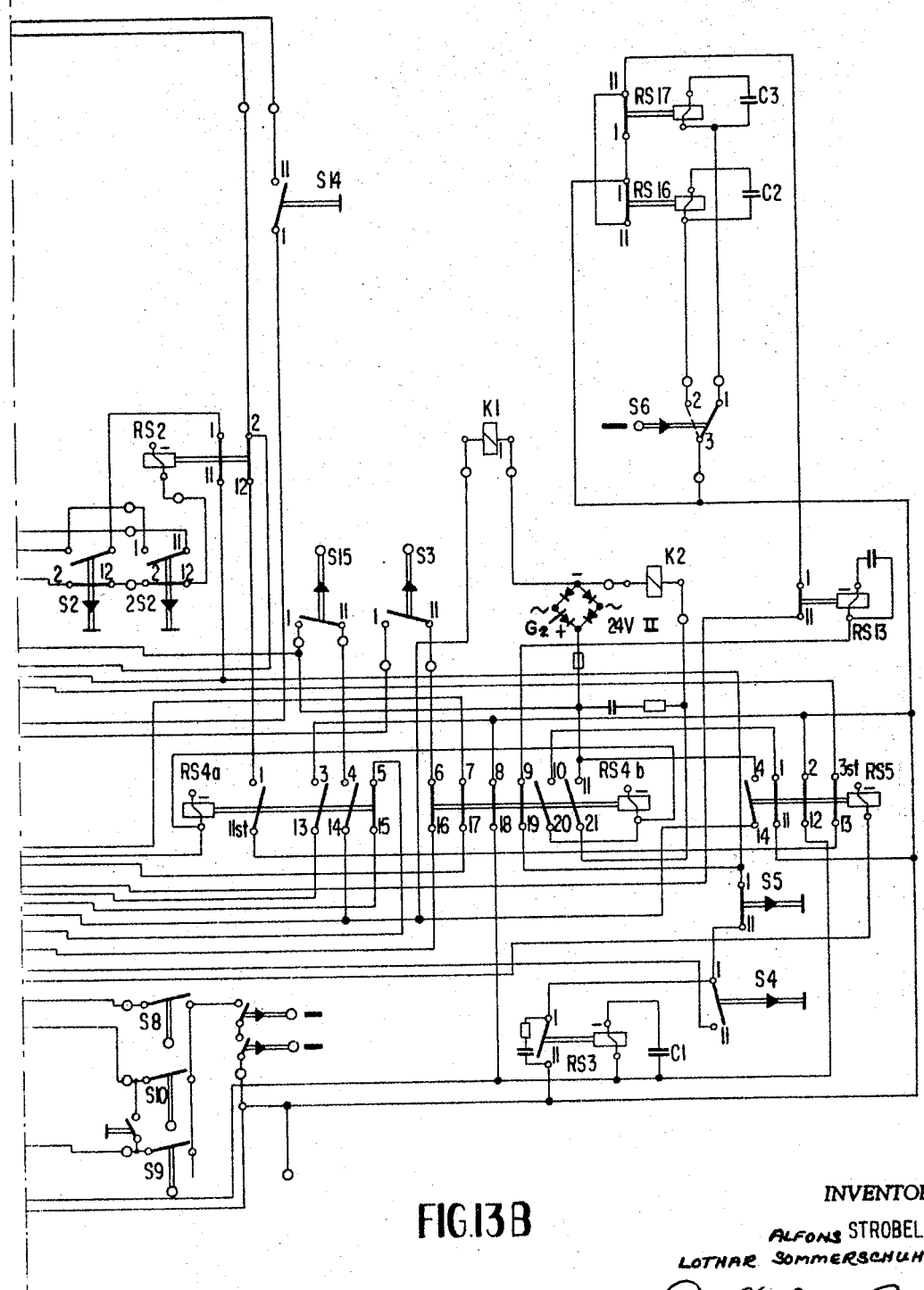

The lapels to be roll padded are placed on the movable carriage 27 over the material carrying rails 29, 29' in the manner of a conventional lapel-roll padding machine. The distances between the material carrying rails 29 and 29' are set to satisfactorily carry the particular lapel. In the starting position, all of the stitch forming elements are suitably spaced from each other for the introduction of the material to be sewn and the push button switch S8 engages the carrying rail 29' behind the needle 7 with a metallic contact to insure transmission of current between them. The switch S1 (FIGURE 13) is then closed to actuate the electrical control circuit, which lights a red pilot light $L_1$ and a green pilot light $L_2$ (FIGURE 13). When this condition has been reached, the push button switch S2 (FIGURE 13) is operated, which will extinguish the red pilot light $L_1$ to indicate that all of the motors are now connected in the electrical circuit. Next, the starting switch S4 is closed to introduce a small current of about 42 volts to the material carrying rail 29' and its associated switch S8 to actuate the brake motor II. With the actuation of the brake motor II, the movable carriage 27 moves to place the lapel tightly under the pressor foot 16, that is, at the position of needle penetration. Before the lapel reaches this spot, the brake motor III moves the plunger 35 downwardly and simultaneously moves the work clamp 15 downwardly by means of an extension 35'''' of the plunger 35 that carries a hook 15' engaging the work clamp 15 (FIG. 3). At this time, the shaft of the brake motor III executes a rotation of 180°. When the movable carriage 27 has traveled an amount sufficient to place the cloth between the tracing switch S8 and the carrying rail 29', the flow of current between the carrying rail 29' and the tracing switch S8 is interrupted to stop the brake motor II for a short period of time, which thereby stops the movement of the carriage 27. Simultaneously, the brake motor II is reversed by the contact of the relay RS/AV11 to move the movable carriage 27 backwards until the tracing switch S8 again engages the material carrying rail 29' for conducting current between them, to deenergize the brake motor II and thus stop the reverse movement of the movable carriage 27. Due to a preselected position of the tracing switch S8, the brake motor II is stopped as mentioned above, in a position where the movable carriage 27 holds the lapel beneath the needle 7 for the execution of the first seam in the intended manner. In this position, the brake motor III, that is, the lifting motor is operated so that its shaft again executes a rotation of 180° to move the plunger 35 and the work clamp 15 upwardly into the sewing position. As soon as the plunger 35 reaches its highest position to form the ridge in the material, the switch S7 (FIGURES 6 and 13) is operated to energize the main sewing machine motor I.

In a working embodiment of the present invention, the main sewing machine motor I is a needle high positioning motor with a speed of approximately 3,000 r.p.m. for normal sewing operation and a slow speed of about 300 r.p.m. for step-by-step sewing operations and needle high positioning. The sewing machine motor I now drives the sewing machine at the high speed used to form the first blind stitch seam. For this purpose, the material carrying rails 29, 29' are driven continuously in the direction of the seam, by the lower shaft 18 through worm gear pair 21, 22, gear pair 23, 24, gear pair 25, 26 and the rack gear 28, with the electromagnetic clutch $K_2$ engaged.

During this first stitch forming operation, the tracing switch S8 moves on the cloth of the lapel. The stitch of the machine is operated at the high speed until the tracing switch S9, which is placed at a convenient predetermined distance in front of the needle 7, moves off the material and engages the material carrying rail 29' for closing an electrical control circuit, which switches the motor I to its low speed of 300 r.p.m. Therefore, the stitch forming mechanism and the movable carriage 27 are operated at this low speed. This operation continues until the movable carriage 27 moves a predetermined distance such that the tracing switch S10, which is placed between the tracing switches S8 and S9, moves off the cloth of the lapel and engages the material carrying rail 29' to close an electrical circuit, which will de-energize the motor I for stopping the stitch forming operation and the movement of the carriage 27. When the motor I is de-energized, the needle 7 will be removed to its elevated position and away from the fabric by means of the needle positioning mechanism within the motor I, in a conventional manner. Thus, the first seam is finished and the needle is in its elevated position.

Next, the automatic control mechanism de-energizes the clutch $K_2$, and energizes the brake motor III to move the plunger 25 and the work clamp 15 into their downward or lower position away from the cloth. Simultaneously, the feed roll 52 is rotated by means of the previously described Bowden wire 48 connection to move the lapel 53 sideways a predetermined distance corresponding to the distance between the intended seams. Thereafter, the automatic control mechanism energizes the brake motor II and the clutch $K_1$ for the return motion of the carriage 27; in this manner, the movable carriage 27 is moved in the reverse direction by means of the brake motor II until the tracing switch S8 moves off the material and establishes contact with the current carrying rail 29' to energize a circuit for de-energizing the brake motor II and the clutch $K_1$, and simultaneously actuate the brake motor III for moving the plunger 35 and the work clamp 15 upwardly to establish the position for commencing the second seam of the lapel.

At this time, the automatic control mechanism energizes the main motor I and the clutch $K_2$ for again beginning the sewing or stitch forming operation during the forward movement of the movable carriage 27; in this manner, all of the previously described operations in the work cycle are repeated until the desired number of parallel seams have been completed to form the roll padding lapel.

The operation of the automatic control unit will now be described with respect to the electrical diagram of FIGURE 13.

The main switch S1 is closed to energize the red pilot light $L_1$ and the green pilot light $L_2$. The transformer T and the rectifiers $G_1$, $G_2$ and $G_3$ generate a low voltage of 24 volts or 42 volts of direct current.

The three rectifier groups $G_1$, $G_2$ and $G_3$, have voltage contacts I for producing 24 volts, II for producing 24 volts and III for producing 42 volts, respectively. All three of the negative poles of the voltage contacts I, II and III are connected (not shown) to the negative contact of each of the relays. The switch S13 is mounted on the brake motor III in such a manner that the cam $N_1$ (FIGURE 6) will close the contacts of the switch in a 180° rotation from the neutral position; during this rotation, the plunger 35 is moved to its upper position. The relay RS10 receives its current from the positive pole of the voltage contact I at 24 volts through the switch S13.

When the push button switch S2 is operated, as mentioned above, the relays RS1a and RS1b are energized to close the contact 7–17. The three phases, 380 volts, are now connected to the contact of the relay RS15; two phases are connected to the contact of the relay RS/AV11 and RS12, and the third phase is connected to a plug (clamp 4) directly to the brake motor II for starting and reverse movement of the carriage 27. The positive plug or terminal 3 on the needle high positioning motor I is connected through relays RS1a and RS1b through contacts 1st–11 and RS5 contacts 3st–13 to contact 11st of RS4a. The negative contact of voltage contacts I has been interrupted by contact 5–15 opened by RS1a and 1b so that the pilot light $L_1$ is switched off. The contacts 6–16 of RS1a and 1b serve to control the function of the thread guard and will be described hereinafter in regard to the specific description of the thread guard.

After introducing the lapel, the switch S4 is switched on to start the operation. The positive contact of voltage contacts III is connected by means of the switch 5, contacts 1–11, to contact 1 of switch S4. When switch S4 is closed, the relay RS7 is energized. First, the relay RS3 is energized through the relay RS7, contacts 9–19. The relay RS3 serves as a main relay switch for the automatic operation of the sewing cycle and the electronic control elements attached thereto. Contacts 8–18 of RS4b and 2–12 of RS5 will deenergize RS3. Upon energizing relay RS3, the material carrying rail 29' of the carriage 27 is supplied with current.

When the tracing switches S8 and S10 engage the current carrying rail 29', that is when there is no material between the tracing switches and the current carrying rail, the tracing switches complete a circuit through the contacts 3–2 and 6–5 of relay RS7 to maintain the relay RS7 energized. With RS7 energized, the contacts 8–18 are opened to prevent the return movement of the movable carriage 27. With the energization of RS7, the contacts 7–17 are closed to supply current from the positive terminal of voltage contacts I through the contacts 1–11 of switch S16 to the relays RS12 and RS14, which are thereby energized. Upon energization of the relay RS14, the electromagnetic clutch $K_1$ is energized from the positive terminal of voltage contacts II through the contacts 5–15 of RS14. The energized clutch $K_1$ mechanically connects the brake motor II with the gear pair 30, 31 for moving the movable carriage 27. Also, when the relay RS14 is energized, the movable contact of 2–3 is switched to establish current through contacts 1–3 for energizing the relay RS15.

As discussed above, RS10 has been energized to move the movable contacts downward and establish the contacts 2–3, 5–6, 8–9 (the three phases for the brake motor III) and 11–12 (for the brake actuating device of motor III). With the energization of the relay RS15, the corresponding movable contacts are moved downwardly to establish current flow between the corresponding contacts of the relays RS15 and RS10 to actuate the motor III. The armature of the motor III rotates through 180°. Then, the above-mentioned cam $N_1$ (FIGURE 6) operates the interrupted switch S13 to deenergize the relay RS10, which in turn breaks the supply of current to and deenergizes the brake motor III. However, during the rotation of the brake motor III, the plunger 35 is moved downwardly and simultaneously the material is fed laterally one increment by the crank 43, angle piece 47, Bowden wire 48, lever 49, clutch 50, shaft 51 and feed roll 52 as described above in regard to FIGURES 6 and 7.

The contacts 4–14 of the relay RS14 are safety contacts that switch off the relay RS/AV11 (AV equals traction slowdown) when the relay RS14 is energized. This relay serves to execute the return motion of the carriage and to switch on and off the motor II. The direction of rotation of the motor II may be changed. Upon energization of the relay 12, the motor II receives current from two phases through the contacts 4–6 and 7–9 (the third phase having already been connected through RS1a–1b, contacts 4–14). The lower contacts of the relay RS12 function to operate the brake of the brake motor II to move the carriage 27 until both of the tracing switches S8 and S10 move on to the material to break their electrical contact with the rail 29' for operating the relay RS7. When the relay RS7 has been deenergized, the opening of the contacts 7–17 deenergizes the relays RS12 and RS14 and the brake motor II brakes the movable carriage. The contacts 5–15 of RS14 are opened to deenergize the clutching device $K_1$.

At this time, current flows from the positive terminal of voltage contacts I through the contacts 10–11 of RZ6, contacts 1–11 of S3, the contacts 6–16 of RS4b, the contacts 8–18 of RS7 (since the relay RS7 is deenergized, the contacts 8–18 assume their normal closed position) and the contacts 4–14 of RS14 (the safety contact is also closed due to the deenergization of the relay RS14) to flow through and energize the relay RS/AV11. At the same time, current is flowing to relay RS15 from the contacts 8–18 of RS7 through the contacts 2–3 of RS14. The period for this switching operation is sufficiently small to prevent the brake motor III from operating sufficiently to rest the plunger 35 so that it retains in its lower position.

By energizing the relay RS/AV11, the brake motor II is switched on for reverse rotation, that is, switched over to its return movement. The contacts 1–11 and 2–12 of RS/AV11 conduct two phases to the brake motor II, while the contacts 3–13 of RS/AV11 and 5–15 of RS4a actuate the brake for the brake motor II. Also, the contacts 4–14 of RS/AV11 actuates the clutching device $K_1$, which was previously switched off by the contacts 5–15 of RS14.

The tracing switches S8, S9 and S10 are positioned in such a manner that the following functions are accomplished. Upon the return motion of the movable carriage, the switch S8 moves off the material and engages the carrying rail 29' to determine the commencement position of the next seam. Upon the seaming operation itself, first the switch S9 will move off the material to engage the current carrying rail 29' and switch the movement of the carriage to the low speed, that is determine the end of the high speed 3,000 r.p.m. operation of the motor. Next, the movable carriage will move at a low speed for about 16 mm. and then the switch S10 will move off the material to engage the current carrying rail 29' and stop movement of the carriage, that is determine the end of the low speed 300 r.p.m. operation of the motor.

After switching over and putting the motor II into the carriage return motion (only a few mm.) and after the switching on of the relay RS/AV11 (already described) the carriage moves backwards until the tracing switch S8 moves off of the material and downwardly into engagement with the current carrying rail 29'. When this happens, the circuit through the switch S8 stops the return motion of the carriage and gives command for sewing. Next, the current flows from the current carrying rail 29' through the switch S8 then the contacts 3–1 of RS7 to the relays RS4a, RS4b to switch them into operation. Through the contacts 1–11 of RS5 and 10–20 of RS4b, the relay RS4a and RS4b are maintained in their energized state.

With relay RS4b energized, the clutch $K_2$ of the sewing mechanism power train is energized through the contacts 11–21 of RS4b; the contacts 9–19 of RS4b have the function of controlling the thread guard as described. As already mentioned, the contacts 8–18 of RS4b serve to maintain the energized state of RS3. The contacts 7–17 of RS4b control the operation, together with the contacts 6–16, required for the commencement of the return motion of the carriage. By energizing the relays RS4a and RS4b, the contacts 6–16 of RS4b are opened to thereby deenergize the relay RS15 and RS/AV11.

To allow the brake of the brake motor II to operate as soon as possible during the end of the return motion of the movable carriage, the brake is operated upon opening of the contacts 5–15 of RS4a; through short circuiting the plugs 3 and 4 of the brake motor II, the mechanically operated brake is lifted by means of an electromagnet. If the brake would be lifted only upon closing the contacts 3–13 of relay RS/AV, the stoppage of the movable carriage at the end of the return motion would be too severe.

At this stage of the operation, the plunger 35 has been lifted, the cam $N_1$ on the brake motor III has switched off the switch S13 and the relay RS10 is deenergized; the contacts are in their neutral position. As soon as the relay RS15 is deenergized, its contacts also move into the neutral position. The brake motor III has been switched on to move the plunger 35 upward and shut off after a rotation of 180°. The relay RS/AV11 is deenergized so that it switches off the brake motor II and stops the return motion soon enough to keep the tracing switches S9 and S10 open because they remain on the material, that is the switches S9 and S10 remain out of contact with the current carrying rail 29'. The switch S15 is mounted on the brake motor III in such a way that, being operated by the cam $N_2$, it closes its contacts during the upward motion of the plunger 35; however, the contacts of switch S15 remain open when the plunger 35 is at its lowest or highest position. During upward motion of the plunger 35, the positive terminal of the voltage contacts II again operates the clutch $K_1$ through the contacts 1–11 of switch S15 and the contacts 4–14 of RS4a. Since in the meantime the brake motor II is not operated, and its brake has been shut off, this short switching on of the clutch $K_1$ connected with the brake motor II exerts a braking effect on the movable carriage.

Up to this point, all the functions beginning with the opening of the switch S8 to start the stitch forming operation until the effective stop of the carriage have been explained. The following description refers to operating the drive and needle high positioning motor I in regard to the sewing operation. The terminal 3 on the motor I is the positive terminal for controlling the motor, the terminal 5 controls the high speed of the motor, and the terminal 7 controls the low speed operation of the motor. Upon reaching its highest position, the plunger 35 switches on the switch S7 (FIGURE 6) through the cam $N_3$ (FIGURE 6) to supply the control current for the sewing motor I through the following contacts: the contacts 1st–11 of RS1a–b, the contacts 1–11 of S7, the contacts 3st–13 of RS5, the contacts 1–11st of RS4a and the contacts 2–12st of RS2 to terminal 7 of the motor I and from the contact 2 of RS2 through the contacts 1st–11 of RS8 and the contacts 1–11 of S14 to the terminal 5 of the motor I. The motor I now drives the blind stitch sewing machine. From the lower shaft 18 of the sewing machine, the carriage 27 is driven continuously through a worm gear pair 21, 22 (FIGURE 4) by a pair of gears 23, 24 and gear pairs 25, 26 in engagement with the rack 28 of the movable carriage 27 under control of the clutch $K_2$.

The tracing switches S8, S9 and S10 move one after the other onto the material. The machine effects the sewing operation at a high speed of 3000 r.p.m. until the tracing switch S9 moves off the material and engages the current carrying rail 29' of the movable carriage 27. Thereby, the tracing switch S9 switches on the relay RS8 which—obtaining current from contact 11 of RS3 remains connected to the contacts 3–13 of RS4a and the contact 2–12 of RS8. With the relay RS8 energized, its contacts 1st–11 form a circuit to switch off the high speed of the motor I and the sewing machine continues the sewing operation at the low speed of 300 stitches per minute until the tracing switch S10 moves off the material and engages the current carrying rail 29' of the movable carriage 27, a distance of approximately 16 mm. Operation of the tracing switch S10 switches on the relay RS5 through the contacts 6–4 of relay RS7. By energizing the relay RS5, its contacts 3st–13 switch off the power to the control for the motor I. Therefore, the sewing machine stops and the motor I removes the needle from the material and puts it in its highest threading position. This operation is carried out with the low speed actuated by the needle high positioner S11 (FIGURE 13) of the motor I installed on the motor shaft (but not visible in the mechanical drawing).

With the relay RS5 energized, its contacts 4–14 actuate the clutch $K_1$ for starting the inward and reverse movement of the carriage 27. This clutch operates as a brake, because the brake motor II still remains braked and stops the carriage 27 as long as the needle 7 can penetrate into the material. If the movable carriage stopped at a later time, so that the needle 7 no longer penetrates into the material, the seam would not be interlaced or locked and it would become undone during the return movement of the carriage 27. Upon energizing the relay RS5, its contacts 2–12 for the relay RS3 are opened, but because of the opening of the contacts 1–11 of RS5, the relays RS4a and RS4b have been switched off so that the relay RS3 remains energized through the contacts 8–18 of RS4b. In order to compensate for the overlapping of the switch off and switch on periods of the two stopping contacts 2–12 of RS5 and 8–18 of RS4b, for energizing the relay RS3, a condenser C1 is placed into the energizing circuit for the relay RS3 to obtain a delay in the switching off of RS3 until the second stop contact can be closed to re-establish the energizing current.

The timing relay RZ6 is switched on by the closing of the contacts 7–17 of RS4b, when the relays RS4a and RS4b are de-energized as mentioned above. After a sufficient slowing down time, the timing relay RZ6 closes its contacts 10–11. During the slowing-down period, the motor I can execute the needle high positioning. Without the slowing-down period, the needle would remain within the fabric and would break upon the return motion of the movable carriage.

At this time, current flows from the positive terminal of the voltage contacts I through the contacts 10–11 of RZ6, contacts 1–11 of S3, the contacts 6–16 of RS4b, the contacts 8–18 of RS7 toward the contacts 2–3 of RS14 and RS15, so that the plunger 35 is moved downwardly and the material is moved laterally a distance corresponding to the space between the seams to be formed by the above-described operation of the feed roll 52.

Furthermore, the current also flows from contact 18 of RS7 to contacts 4–14 of RS14 and then to the coil of relay RS/AV11. As already described above, the clutch $K_1$ and the brake motor II are switched on to effect the return motion of the carriage 27.

All functions described up to now, that is, the functions taking place between the closing of the first switch of the brake motor until the last mentioned operation, will have taken place.

Each lapel is of an approximately triangular shape having a sharp point at its lower extremity. The padding is from the inside toward the outside, that is, from the so-called lapel break toward the outside of the lapel. Since the seams run parallel in relation to the lapel breaks, they must subsequently become shorter. The last several seams are so short that the tracing switch S9 remains in continuous contact with the current carrying rail 29' of the movable carriage so that the machine operates at the speed of only 300 stitches per minute. Upon reaching a seam length of about four centimeters, the tracing switches S8 and S10 will no longer move onto the material and thus contact is established with the current carrying rail 29' so that the relays RS4a, RS4b and RS5 are switched on simultaneously. The two stop contacts for RS3, that is, the contacts 8–18 of RS4b and 2–12 of RS5 are opened, so that the relay RS3 is switched off as soon as the condenser C1 decays. The automatic control device of the present invention is now switched off.

The material carrying rail 29' no longer receives any current so that the tracing switches S8, S9 and S10 cannot perform any function. The contact 7–17 of RS4a switches on the timing relay RZ6, whereby the needle is placed into its upper position by the needle high positioning device of the motor I. Afterwards, the contacts 10–11 of RZ6 will be closed and through the contacts 1–11 of S3, contacts 6–16 of RS4b, contacts 8–18 of RS7, contacts 2–3 of RS14 and contacts 4–14 of RS14 they will excite RS15, so that the plunger 35 will be moved downwardly out of engagement with the material. Likewise, RS/AV11 will be energized to operate the return movement of the movable carriage 27. The movable carriage 27 moves completely away from the machine, the switch S3 switches off the return motion, the movable carriage 27 comes to a halt, the automatically padded (blind stitched) lapel can be withdrawn from the carriage 27 and another lapel to be padded can be placed on the carriage 27. The lapel-roll padding automat of the present invention is equipped with a thread guard that has been specifically designed to operate with this unit to stop the motor I in case of thread breakage during any of the operations. The switch S6, which is provided with two contact positions, controls the operation in the event there is a thread breakage. The switch contacts are controlled by a permanent magnet 66 that is rigidly carried by a shaft 65 (FIGURES 9 and 10). The thread in its travel to the needle is placed around a small pulley 67, which is rigidly secured to the shaft 65. During the sewing operation, the thread is drawn from the pulley 67 to rotate the latter. The pulley 67 rotates the shaft 65 so that the contacts 3–2 of S6 and 3–1 of S6 are opened and closed alternately by the rotating magnet 66. The contact 3 of S6 is directly connected in circuit with the contact 11 of RS3 so that it receives current as long as the tracing control mechanism is switched on (the tracing control mechanism is compoosed of all the control elements that are controlled by the voltage contacts III through the main relay switch contacts 1–11 of RS3). The energizing coil of RS16 is connected to the contact 2 of switch S6 and the energizing coil of relay RS17 is connected to the switch contact 1 of S6.

During the sewing operations, the contacts of the switch S6 transmit current to the relays RS16 and RS17 as long as the thread does not break. To maintain the relays RS16 and RS17 in their switched on condition as long as the thread drives the pulley 67, capacitors C2, C3, are placed in circuit with the energizing coils of the relays RS16 and RS17. The capacitors proved a current delay to compensate for the short period of time that the movable contact is between the contacts 1 and 2 of the switch S6.

Each of the relays RS16 and RS17 is equipped with a movable contact. The contact 1 of RS16 and the contact 1 of RS17 are directly provided with current from the contact 11 of RS3. The contacts 11 of RS16 and RS17 transmit current as long as their respective relays are de-energized, that is, as long as their energizing coils do not receive current. The current from these contacts travels through the contacts 1–11 of RS13, contacts 3–13 of RS8, contacts 2–12 of S2 and contact 12 of 2S2 to the energizing coil of relay RS2. In the event of thread breakage, the pulley 67 is stopped and one of the two contacts 1 or 2 of switch S6 will remain open. Therefore, one of the two relays RS16 or RS17 will not receive any energizing current and will be switched off as soon as its capacitor has decayed. With one of the relays RS16 or RS17 remaining energized, current will flow through the contacts 1–11 of RS13, the contacts 3–13 or RS8, the contacts 2–12 of S2 and the contacts 12–2 of 2S2 for energizing the coil of the relay RS2 for switching on the relay RS2. When this happens, the current for controlling the motor I, the current applied to the terminal 3 of the motor I, is interrupted by the opening of the contacts 2–12 of relay RS2 to stop the operation in the shortest possible period. The needle high positioning device of the motor I removes the needle from the material and renders it motionless so that the operator can rethread the needle.

Upon switching on the relay RS2, the stopping contacts 1–11 of RS2 for the RS1a and RS1b are switched off. The contacts 6–16 of RS1a, 1b are now closed and serve as a stopping contact for the relay RS2 during the rethreading operation. Upon rethreading, the thread is drawn over the pulley 67 to again place into operation the contacts of the switch S6. The relays RS16 and RS17 therefore receive current. Upon opening of the contacts of the relays RS16 and RS17, the relays RS2 would be switched off and the machine would continue to operate, hindering the operator in his attempt to rethread the needle 7. Upon switching off the relays RS1a, 1b, the contact 5–15 of RS1a, 1b is closed and the red pilot lamp L₃ is switched on to indicate that there is a thread breakage. After threading, the operator pushes the switch 2S2 so that the relay RS2 is switched off, closing simultaneously its contacts. Now, current is transmitted from the positive terminal of the voltage contacts III through the contacts 11–1 of RS2, the contacts 11–1 of 2S2 to the relay RS1a, 1b, which are switched on and put into circuit with the contacts 7–17 of RS1a, 1b. Upon closing the contacts 1st–11 of RS1a, 1b, the control current for the needle high positioning motor I is switched on and the motor continues to operate. Switching off the three phases of the 300 volt supply through contacts 2st–12, 3st–13, 4st–14 of the RS1a, 1b by operation of the thread guard will have no influence. (For the sake of simplicity, the relays RS1a and RS1b have been combined.)

In order to maintain the capacitors on relays RS16 and RS17 as small as possible to thereby reduce as much as possible the period elapsing between the thread breakage, the opening of one of the contacts 3–2 or 3–1 of S6 until the switching on of the relay RS2 and the effective stopping of the machine, the capacitance of the capacitors has been set at a rotating speed of 3,000 r.p.m., which is the fastest unwinding of the thread corresponding to the highest rotating speed of the small size pulley 67 on the thread guard switch S6. Therefore, the thread-guard must be switched off whenever the machine operates at a reduced rotating speed, for example, when forming the shortest seams of the padding operation, for example the last two or three seams. When switching off the fast rotation through the relay RS8 and upon the removal of the tracing switch 9 from the material to contact the current carrying rail 29' the functioning of the thread guard is interrupted upon opening the contacts 3–13 of RS8. When stopping the machine upon finishing a seam at a high speed, the tracing switch S9 and S10 operates the needle high positioning when a reduced speed is reached. To simplify the switching, the switching off of the thread guard has also been shown as being accomplished by only one relay. Upon the return motion of the carriage at the end of a seam and upon the starting movement of the carriage through the relay RS2, the thread guard would cause the discharge of the relays RS1a, 1b thereby interrupting the return motion and the starting motion; therefore, it must be switched off. The relays RS4a and RS4b remain deenergized as long as the carriage is going through its starting motion or its return motions. Therefore, the normal closed position of the contacts 9–19 of RS4b supplies current to energize the relay RS13, which opens the contacts 1–11 of RS13 for switching off the thread guard circuits and elements.

At this point in the description of the diagram, it may be mentioned that in order to set the correct stitch depth of the needle 7 in its penetration of the outer material to produce a blind stitch and to guarantee the correct height of plunger 35, a test seam must be sewn, or several such seams must be sewn. Such a testing is accomplished by actuating the starter switch 4 so that the carriage 27 carrying the lapel to be sewn is started and the machine begins to operate as described above. After finishing one or several test seams, the carriage 27 is moved away and stopped by means of the stop switch S5 (FIGURE 13). Therefore, the lapel 53 can be test sewn to ascertain the correct tacking of the blind stitch. The blind stitch roll padding machine used to accomplish the above-mentioned automatic roll padded work is provided with the conventional upper feed 4, 5. The top feed dog 5 that exerts pressure from above on the material feed plate or work clamp 15 feeds the layers of material at the same speed as the carriage 27 which carries the lapel on its carrying rail 29, 29'. The top feed dog 5 only feeds when the needle is removed from the layers of material, as is conventional with blind stitch sewing machines. The carriage 27 feeds continuously, that is, even when the needle is within the material. Thereby, a certain gathering of material is produced on the layers of material that remain on the carriage. However, this does not cause any harmful effects on the elastic portions of the lapel, that is, the upper side of the canvas, the inner lining and the outer layer of material, because any effect is eliminated as soon as the needle moves out of the material and the top feed dog 5 engages and moves the layers of material.

The work clamp 15 is located directly adjacent and on each side of the plunger 35 to press the material against the lower side of the presser foot 16 before the needle penetrates the material. The plunger 35 extends upwardly between the two portions of the work clamp 15 to produce a ridge in the material to facilitate the sewing operation with the curved needle 7 in the well known conventional manner of blind stitch sewing machines. The presser foot 16 of the blind stitch sewing machine may be provided with a knife in the manner illustrated in the Strobel Federal German Republic Patent No. 1,404,308. Such a knife serves to cut the thread after each seam has been completed and upon the return stroke of the lapel carrying carriage.

As already described, the machine is also equipped with a special thread guard, so that the entire unit is stopped in case there is a thread breakage. The functioning of this thread guard is described in more detail in regard to the description of the electrical automatic control mechanism.

Also, it is contemplated that the automatic lapel roll padding blind stitch machine can be constructed not only as a right hand machine but also as a left hand machine, and that in general (according to the Federal German Republic Ptent No. 953,570 to Strobel), one right hand and one left hand lapel roll padding blind stitch machine can be mounted adjacent to one another and each equipped with a separate stand.

Also, it is contemplated that the blind stitch sewing machine of the present invention can be adapted to be set on a column in accordance with the teachings of the German Federal Republic Patent 1,151,166 (a supplemental to the German Federal Republic Patent 953,570), that is, supplied with a common vertical stand.

Furthermore, it is contemplated that the above-described automatic electrical control unit may be used for controlling the automatic joining of stacked layers of material executed by means of ordinary sewing machines, lock stitch sewing machines, etc. Also, it is contemplated that the above-mentioned automatic features of the present invention may be applied to control the quilting layers of material stacked flatly with respect to one another, that is, for effecting quilting work on canvas.

The above embodiments have been shown and described only as examples of the present invention; other modifications and embodiments according to the broad aspects of the present invention are contemplated within the spirit and scope of the present invention as defined by the following claims.

We claim:
1. A sewing machine, comprising: a stitch forming mechanism including needle means for inserting a thread into material to be sewn; longitudinal feed means for selectively moving the material longitudinally; transverse feed means for selectively moving the material and transversely; automatic control means for controlling and coordinating said needle means, longitudinal feed means and transverse feed means for producing in automatic succession at least a first seam of a predetermined fixed length in a predetermined fixed position on said material, and a second independent and separate seam of a predetermined fixed length independent of said first seam length and in a predetermined fixed spaced position on said material with relation to said first seam position; a longitudinally extending material carrying electrically conductive rail; said automatic control means supplying said rail with current when actuated; said automatic control means including a plurality of tracing switches; means for mounting said tracing switches in spaced predetermined relationship fixed with respect to each other; means for mounting said rail and said tracing switches for relative movement and in electrical circuit contact only in the absence of material to be sewn between said rail and said tracing switches.

2. The device according to claim 1, wherein said stitch forming mechanism includes a looper and means for forming a ridge in the material to form a blind stitch in cooperation with said needle means for producing rolled lapel-type quilting work on the lapels of coats, jackets, overcoats and similar garments; and said automatic control means also controlling said stitch forming mechanism, longitudinal feed means and transverse feed means for producing said first and second seam each in substantially straight lines, substantially parallel and transversely spaced from each other and of different lengths.

3. The device of claim 2, wherein said rail consists of stainless steel.

4. The device of claim 1, wherein said longitudinal feed means includes a longitudinally movable material carriage and drive means including a motor for moving said carriage longitudinally; said needle means, transverse feed means, and ridge forming means having a plurality of driving brake motors; said automatic control means including a plurality of cams, switches operated by said cams and relay controlled switches in circuit with said motors to operatively control the starting and stopping of said motors for moving said carriage longitudinally forward and longitudinally backward, moving said ridge forming means into operative material ridge forming positions and retracting said ridge forming means from its ridge forming position away from said material; and the motor in said needle means having needle high positioning means.

5. The device according to claim 4, wherein said automatic control means is pattern controlled according to the shape of the material to be sewn during the sewing operations, and has means, including said tracing switches and said rails, for independently automatically determining the shape of each material that is supplied to the machine for determining the corresponding pattern; and said automatic control means switching itself off automatically when it has finished sewing operation according to the automatically determined shape of the specific material to be sewn.

6. The device according to claim 5, wherein said motor for said longitudinal feed means includes a braking device, and said automatic control means switches on said braking device when said carriage is to be stopped.

7. The device according to claim 6, wherein said longitudinal feed means includes an electrically operated first clutch in the drive train from the carriage motor to said carriage; said automatic control means engages said first clutch for a brief period after the return backward longitudinal motion of said carriage between the end of forming said first seam and the beginning of forming said second seam for exerting a braking effect on said carriage during the movement of said ridge forming means toward the material in the forming of the blind stitch material ridge.

8. The device according to claim 7, said automatic control means engaging said first clutch for a brief period after the carriage has stopped its forward longitudinal motion in the forming of said first seam, while said needle means still penetrates the material to be sewn for allowing sufficient time for the correct looping of the thread for avoiding untying of the thread during the subsequent return backward longitudinal motion of the carriage in preparation for the forming of said second seam.

9. The device according to claim 8, wherein said automatic control means includes a timing relay means for delaying the return backward longitudinal motion of said carriage after said first seam has been formed to allow sufficient time for the removal of the needle from the material by said needle high positioning device to avoid breakage of the needle.

10. The device according to claim 9, including an additional material carrying rail similar to said first-mentioned material carrying rail; said rails being mounted on each side of said ridge forming means for supporting the material in its passage through said stitch forming mechanism.

11. The device of claim 10, wherein said transverse feed means includes a driven material feed roll; including a plurality of resiliently biased presser rolls for resiliently pressing the material onto said rails and said driven material feed roll.

12. The device of claim 11, including means for moving said pressed rolls against their bias away from the respective rails, and driven material feed roll to provide sufficient space for easily withdrawing and supplying the material to the sewing machine.

13. The device according to claim 12, wherein said automatic control means includes a thread guard unit having its own housing mounted as a separate unit to the main head housing of the sewing machine; said unit including a pulley in engagement with the needle thread to be driven thereby, and a permanent magnet mounted for movement by said pulley; said unit including a magnetically actuated switch mounted adjacent to said magnet to be operated thereby; an indicating lamp; and circuit means for lighting said indicating lamp when said magnetically actuated switch ceases movement to indicate a thread breakage.

14. The device of claim 13, including circuit means for controlling the operation of said needle means motor and having two relay actuated switches and control circuits associated with each of said relay actuated switches for energizing the respective relays and providing a delay in the deenergizing of the respective relays; said magnetically actuated switch being constructed to alternately make and brake each of said two control circuit means at a frequency sufficiently high to prevent the denergization of one of said relays by switching off and on the energizing current within the delay period for each of said relay switches.

15. The device according to claim 1, wherein said automatic control means includes an electrical control circuit including a plurality of switches and relays, is pattern controlled according to the shape of the material to be sewn during the sewing operation, and has means, including said tracing switches and said rail, for independently automatically determining the shape of each material that is supplied to the machine for determining the corresponding pattern; and said automatic control means switching itself off automatically when it has finished the sewing operation according to the automatically determined shape of the specific material to be sewn.

16. A sewing machine, comprising; a stitch forming mechanism including needle means for inserting a thread into material to be sewn; longitudinal feed means for selectively moving the material longitudinally; transverse feed means for selectively moving the material transversely; automatic control means for controlling and coordinating said needle means, longitudinal feed means and transverse feed means for producing in automatic succession at least a first seam of a predetermined fixed length in a predetermined fixed position on said material, and a second independent and separate seam of a predetermined fixed length independent of said first seam length and in a predetermined fixed spaced position on said material with relation to said first seam position; said automatic control means including a thread guard unit having its own housing mounted as a separate unit to the main head housing of the sewing machine; said unit including a pulley in engagement with the needle thread to be driven thereby, and a permanent magnet mounted for movement with said pulley; said unit including a magnetically actuated switch mounted adjacent to said magnet to be operated thereby; an indicating lamp; circuit means including said magnetically actuated switch for lighting said lamp when said magnet ceases movement to indicate a thread breakage.

17. The device according to claim 16, wherein said needle means includes a driving motor and motor circuit means for controlling the operation of said driving motor; said motor circuit means having two relay actuated switches, each of said relay actuated switches having a control circuit for energizing its respective relay and providing a delay in the deenergizing of its respective relay; said magnetically actuated switch being constructed to alternately make and break each of said control circuits for said relay actuated switches at a frequency sufficiently high to prevent the deenergization of one of said relays by switching off and on the energizing current within the delay period for deenergization.

18. The device according to claim 16, wherein said stitch forming mechanism includes a looper and means for forming a ridge in the material to form a blind stitch in cooperation with said needle means for producing rolled lapel-type quilting work on the lapels of coats, jackets, overcoats and similar garments; and said automatic control means controlling said stitch forming mechanism, longitudinal feed means and transverse feed means for producing said first and second seam each in substantially straight lines, substantially parallelly transversely spaced from each other and of materially different lengths.

19. The device according to claim 18, wherein said needle means includes a driving motor and motor circuit means for controlling the operation of said driving motor; said motor circuit means having two relay actuated switches, each of said relay actuated switches having a control circuit for energizing its respective relay and providing a delay in the deenergizing of its respective relay; said magnetically actuated switch being constructed to alternately make and break each of said control circuits for said relay actuated switches at a frequency sufficiently high to prevent the deenergization of one of said relays by switching off and on the energizing current within the delay period for deenergizaton.

20. A sewing machine, comprising: a needle; needle actuating means for driving said needle into and out of a material to be sewn, and including a driving motor having a motor control circuit; automatic control means for detecting the breakage of the thread used by said needle and for switching off said driving motor when thread breakage has been detected; said automatic control means including a pulley in engagement with the needle thread to be driven thereby, a permanent magnet mounted for rotation with said pulley; a magnetically actuated switch means mounted adjacent to said magnet for operation by the movement of said magnet, said magnetically actuated switch means supplying current to operate said driving motor only as long as said magnet is moved by said pulley and for switching off the supply of current to said driving motor when said permanent magnet ceases to move when there is a thread breakage.

21. The device according to claim 20, wherein said magnetically actuated switch means includes two relay actuated switches, each having a relay energizing circuit; said magnetically actuated switch means including a switch for alternately opening and closing said relay energizing circuit to alternately energize and deenergize said relay at a frequency directly related to the movement of said permanent magnet; said relay energizing circuit including means for providing a delay in the deenergizing of each relay that provides a delay period longer than the period between the making and breaking of said energizing circuit.

22. A blind-stitching sewing machine, particularly a roll pad stitching machine, comprising: a needle; first motor means for driving the needle; a stitch plate beneath the needle having an elongated slot therein; a carriage movable longitudinally in a direction parallel with said slot; second motor means for driving the carriage; a pair of cloth-carrier rails mounted on said carriage, one of which rails is electrically conductive; a cloth-bender between said rails; third motor means for moving the bender up and down in said slot; means for adjusting the amount by which the bender can move up into the slot in the stitch plate; first, second and third feeler switches biased towards the electrically conductive cloth-carrier rail; feed means for moving the cloth laterally relative to the rails; automatic control means simultaneously actuating said second motor means to move the carriage longitudinally and said third motor means to move the bender upwards, until the cloth moves to a position where it lies between the conductive rail and the first feeler switch thereby interrupting the current flow between said conductive rail and feeler switch; said control means, in response to current interruption to said first switch, stopping said second motor means and subsequently reversing it to move the carriage back until the first feeler switch again contacts the conductive rail; said control means thereafter actuating said second motor means to move the bender upwards and subsequently start the first motor means to sew a seam until the second feeler switch runs off the cloth and contacts the conductive rail to switch the first motor to a slower speed until the third switch runs off the cloth and contacts the conductive rail to switch off the first motor means; said control means thereafter actuating the third motor means to move the bender upwards and at the same time operate the feed means to move the cloth laterally by a distance of at least one width of the seam interval; said control means thereafter actuating the second motor means to move the carriage back until the first switch runs off the cloth, the carriage then being in a position at the start of a subsequent seam for further automatic operation.

23. A blind-stitching sewing machine according to claim 22, including a rod carrying said bender and a cylinder receiving therein, with a lost motion driving connection therebetween, said rod; said cylinder having a pin and eye eccentric driving connection with said third motor means to move the eye up and down and thus move the bender up and down, respectively, by a lesser amount due to the lost motion connection between said rod and said cylinder.

24. A blind-stitching sewing machine according to claim 23, wherein the feed means comprises a powered feed roll and a presser roll biased against the feed roll for clamping the cloth therebetween.

25. A blind-stitching sewing machine according to claim 24, wherein said cloth carrier rails are immediately adjacent the cloth bender so that the cloth layers of a lapel run in sufficiently curved form through the machine.

26. A blind-stitching machine according to claim 22, including thread breakage detector means for switching off said first motor means when thread breakage has been detected, including a pulley in engagement with the needle thread to be driven thereby, a permanent magnet mounted for rotation with said pulley, a magnetically actuated switch means mounted adjacent to said magnet for operation by the movement of said magnet, said magnetically actuated switch means supplying current to operate said first drive motor means only as long as said magnet is moved by said pulley and for switching off the supply of current to said driving motor when said permanent magnet ceases to move when there is a thread breakage.

27. A blind-stitching sewing machine according to claim 26, wherein said magnetically actuated switch means includes two relay actuated switches, each having a relay energizing circuit, said magnetically actuated switch means including a switch for alternately opening and closing said relay energizing circuit to alternately energize and de-energize said relay at a frequency directly related to the movement of said permanent magnet, said relay energizing circuit including means for providing a delay in the deenergization of said relay that provides a delay period longer than the period between the making and breaking of said energizing circuit.

28. A blind-stitching sewing machine according to claim 22, wherein the feed means comprises a powered feed roll and a presser roll biased against the feed roll for clamping the cloth therebetween.

29. A blind-stitching sewing machine according to claim 28, wherein said cloth carrier rails are immediately adjacent the cloth bender so that the cloth layers of a lapel run in sufficiently curved form through the machine.

30. A blind-stitching sewing machine according to claim 22, wherein said cloth carrier rails are immediately adjacent the cloth bender so that the cloth layers of a lapel run in sufficiently curved form through the machine.

References Cited

UNITED STATES PATENTS

| | | | |
|---|---|---|---|
| 2,627,828 | 2/1953 | Buono | 112—178 |
| 2,837,046 | 6/1958 | Carson et al. | 112—118 |
| 2,874,661 | 2/1959 | Parry et al. | |
| 3,100,468 | 8/1963 | Taylor | 112—178 |
| 3,156,203 | 11/1964 | Adam et al. | 112—118 X |
| 3,263,632 | 8/1966 | Hinko | 112—118 |

HERBERT F. ROSS, Primary Examiner

U.S. Cl. X.R.

112—2, 118